United States Patent
Yang et al.

(10) Patent No.: US 12,486,764 B2
(45) Date of Patent: Dec. 2, 2025

(54) METHOD FOR CORRECTING MEASUREMENT VALUES OF PHYSICAL PROPERTIES OF LAUMONTITE-RICH CLASTIC ROCK RESERVOIRS THAT ARE OBTAINED BASED ON OVERBURDEN PRESSURE POROSITY AND PERMEABILITY TESTS

(71) Applicant: Chengdu University of Technology, Sichuan (CN)

(72) Inventors: Tian Yang, Sichuan (CN); Qing He, Sichuan (CN); Laixing Cai, Sichuan (CN); Wenqiang Yu, Sichuan (CN); Xiaofang Li, Sichuan (CN)

(73) Assignee: Chengdu University of Technology, Chengdu (CN)

( * ) Notice: Subject to any disclaimer, the term of this patent is extended or adjusted under 35 U.S.C. 154(b) by 309 days.

(21) Appl. No.: 18/334,348

(22) Filed: Jun. 13, 2023

(65) Prior Publication Data

US 2024/0418086 A1    Dec. 19, 2024

(51) Int. Cl.
*G01N 15/08* (2006.01)
*E21B 49/08* (2006.01)
*G01N 33/24* (2006.01)

(52) U.S. Cl.
CPC ....... *E21B 49/088* (2013.01); *G01N 15/0826* (2013.01)

(58) Field of Classification Search
CPC .... G01N 15/00; G01N 15/08; G01N 15/0826; G01N 33/24; E21B 49/00; E21B 49/088
See application file for complete search history.

(56) References Cited

U.S. PATENT DOCUMENTS 5,442,950 A * 8/1995 Unalmiser ........... G01N 15/088
73/152.05

FOREIGN PATENT DOCUMENTS

| CN | 104297131 A * | 1/2015 | ............ G01N 15/08 |
| CN | 114624163 A * | 6/2022 | ............ G01N 15/088 |
| WO | WO-2024108689 A1 * | 5/2024 | ............ G01N 23/046 |

OTHER PUBLICATIONS

Cn-114624163-A Machine Translation (Year: 2022).*
WO-2024108689-A1 Machine Translation (Year: 2024).*
CN-104297131-A Machine Translation (Year: 2015).*

* cited by examiner

*Primary Examiner* — Nguyen Q. Ha

(57) ABSTRACT

A method for correcting measurement values of physical properties of laumontite-rich clastic rock reservoirs that are obtained based on overburden pressure porosity and permeability tests. The method includes: selecting rock samples taken from laumontite-rich clastic rock reservoir spaces; conducting porosity and permeability tests on the selected rock samples under normal temperature and pressure conditions; analyzing a type of a reservoir cement and characteristics of a reservoir space by using a respective selected rock sample; determining laumontite contents and development degrees of pseudo fractures in the selected rock samples having different laumontite contents; comparing variations in porosity and permeability between the selected rock samples taken from the laumontite-containing reservoir spaces and rock samples taken from a laumontite-free reservoir space under overburden pressure conditions; fitting a variation function to establish relations between the porosity, permeability, and overburden pressure for the selected rock samples taken from laumontite-rich clastic rock reservoir spaces; and creating a correction plate of permeability of reservoirs having different laumontite contents.

8 Claims, 14 Drawing Sheets

METHOD FOR CORRECTING MEASUREMENT VALUES OF PHYSICAL PROPERTIES OF LAUMONTITE-RICH CLASTIC ROCK RESERVOIRS THAT ARE OBTAINED BASED ON OVERBURDEN PRESSURE POROSITY AND PERMEABILITY TESTS

TECHNICAL FIELD

The present disclosure belongs to the technical field of oil and gas exploration and development, and in particular, relates to a method for correcting measurement values of physical properties of laumontite-rich clastic rock reservoirs that are obtained based on overburden pressure porosity and permeability tests.

BACKGROUND TECHNOLOGY

Parameters such as a porosity and permeability of clastic rock reservoirs objectively reflect capabilities of the reservoirs to store and transport oil, gas, water, and other fluids. Accurate measurement of such parameters is crucial to accurate decision-making in oil and gas exploration and deployment of efficient development solutions. However, due to some technical barriers, conventional methods for measuring the porosity and permeability of a clastic rock reservoir are confined to drilling underground rock cores and conducting analytical tests on the surface. Such methods are constrained by substantial differences in temperature and pressure conditions between the surface and underground. Additionally, when clastic rock reservoirs contain temperature and pressure-sensitive cements, the porosity and permeability measured on the surface differ significantly from the values obtained under actual underground conditions.

Laumontite, a typical cement sensitive to temperature and pressure, is widely developed in clastic rock reservoirs in petroliferous basins in China, such as the Shaximiao Formation in the Sichuan Basin, the Yanchang Formation in the Ordos Basin, the Jiamuhe Formation in the Junggar Basin, which holds significant geological importance for oil and gas exploration. When rocks are brought to the surface from underground, rapid release of stratigraphic stress occurs. Due to the substantial difference in expansion rates between laumontite cements and clastic particles, the decompression expansion exceeds the elastic deformation strength of the rocks. This causes the separation of cements from clastic particles, resulting in the formation of pseudo fractures around the clastic particles. As a consequence of these pseudo fractures, the porosity and permeability values of reservoirs measured under normal surface temperature and pressure conditions are significantly higher than those measured under stratum temperature and pressure conditions.

Therefore, it is of great significance for accurately determining the physical properties of laumontite-rich clastic rock reservoirs under burial conditions by carrying out a correction to eliminate errors in a measurement of the physical properties such as porosity and permeability caused by the formation and/or development of pseudo fractures when a laumontite-rich clastic rock sample is brought to the ground surface for the measurement. This correction provides valuable references for selecting favorable exploration areas for this type of oil and gas reservoir. Currently, many studies have overlooked the influence of pseudo-fracture development on the physical properties of laumontite-rich reservoirs. However, some scholars have conducted correction recovery by employing methods such as casting thin-section surface porosity, low-pressure perfusion, and porosity-permeability regression.

The above methods still have the following problems in the correction recovery against the influence of pseudo-fracture development on the porosity and permeability in laumontite-rich reservoirs:

1) The casting thin-section surface porosity method involves combining view fields of a casting thin-section and identifying pseudo fractures through image analysis to calculate the porosity and permeability of reservoirs without pseudo-fracture development. However, this method is complex to perform, requires many high-quality samples for analysis, and may encounter issues such as poor pore continuity and difficulties in identifying pore edges. Additionally, it is prone to the influence of subjective human judgment.

2) The low-pressure perfusion method involves perfusing rock cores of a whole diameter under a low pressure, and analyzing the variation trend of permeability by changing the confining pressure to calculate the permeability of a stratum under the burial condition. However, it should be noted that the permeability measured by this method still represents the permeability after pseudo-fracture development, and does not account for the correction of porosity and permeability.

3) In the porosity-permeability regression method, the permeability of reservoirs is influenced by various factors; and in cases where the permeability is highly correlated with the porosity, the permeability may be represented using a simple porosity-permeability regression. However, when the pore throat system of a reservoir is complex, and there is a weak correlation between porosity and permeability, it is necessary to consider other geological factors that affect permeability changes.

In summary, considering the influence of pseudo fracture development on the porosity and permeability of the laumontite-rich clastic rock reservoirs, it is urgent to develop a correction method that is simple and convenient to operate, highly accurate, and applicable to actual geological conditions.

Summary of the Utility Model

In view of the above technical problems, the present disclosure provides a method for correcting physical properties of laumontite-rich clastic rock reservoirs based on overburden pressure porosity and permeability tests.

Accordingly, the present disclosure employs the following technical solution:

A method for correcting measurement values of physical properties of laumontite-rich clastic rock reservoirs that are obtained based on overburden pressure porosity and permeability tests.

The method includes:
  step 1: selecting rock samples taken from a laumontite-rich clastic rock reservoir in a research area and subjecting the rock samples to porosity and permeability tests under a normal temperature and pressure;
  step 2: grinding the rock samples into casting thin-sections, and analyzing a type of a reservoir cement and characteristics of a reservoir space corresponding to the rock samples taken therefrom;
  step 3: determining laumontite contents and development degrees of pseudo fractures in the rock samples having different laumontite contents;

step 4: measuring a porosity and permeability of selected representative rock samples having the different laumontite contents under an overburden pressure condition;

step 5: comparing variations in the porosity and permeability between the selected representative rock samples taken from the laumontite-rich clastic rock reservoir and rock samples taken from a laumontite-free reservoir under the overburden pressure condition;

step 6: fitting a variation relation function of the porosity and permeability of the selected representative rock samples taken from the laumontite-rich clastic rock reservoir and the rock samples taken from the laumontite-free reservoir under the overburden pressure condition to derive a correction; and step 7: establishing a correction plate of the permeability of the laumontite-rich clastic rock reservoir with different laumontite contents by comparing the variations in the porosity and permeability corresponding to the rock samples taken from the laumontite-rich clastic rock reservoir with the different laumontite contents under the overburden pressure condition.

In an exemplary embodiment of the present disclosure, the porosity test in step 1 includes:

determining a total volume of a prepared rock sample by measuring a length and diameter of the prepared rock sample using a vernier caliper;

reading a pore volume of the rock sample under a corresponding gas input pressure by adjusting a pressure regulator;

determining a solid phase volume of the rock sample by comparing the pore volume with a standard curve; and quantitatively calculating the porosity of the rock sample according to the Boyle's law;

wherein the pore volume is obtained by subtracting a particle volume from the total volume of the rock sample, and the porosity is calculated according to the following formula:

a)

$$\varphi = \frac{V_p}{V_b} = \frac{V_b - V_g}{V_b} \quad \text{Formula (1)}$$

wherein $V_b$ represents the total volume of the rock sample; $V_g$ represents the particle volume; $V_p$ represents the pore volume; and $\varphi$ represents the porosity.

In an exemplary embodiment of the present disclosure, in step 1, the permeability test in step 1 includes:

measuring a pressure difference and a flow rate by allowing helium with a known viscosity to flow through a rock sample with a known size;

measuring an inlet pressure and an outlet pressure using a pressure gauge; and measuring a gas flow by using a calibrated vent hole to calculate a gas permeability of the rock sample, wherein the gas permeability is calculated according to the following formula:

$$K = \frac{2\mu Q L P_0}{A(P_1^2 - P_2^2)} \times 10^{-1} \quad \text{Formula (2)}$$

wherein K represents the permeability of the rock sample, in the unit of $\mu m^2$; A represents a cross-sectional area of the rock sample, in the unit of $cm^2$; L represents the length of the rock sample, in the unit of cm; $\mu$ represents a gas viscosity, in the unit of mPa·S; Q represents a gas flow under an absolute atmospheric pressure, in the unit of $cm^3/s$; $P_0$ represents an atmospheric pressure, in the unit of MPa; $P_1$ represents an inlet pressure of the rock sample, in the unit of MPa; and $P_2$ represents an outlet pressure of the rock sample, in the unit of MPa.

In an exemplary embodiment of the present disclosure, in step 2, grinding the rock samples into the casting thin-sections in step 2 includes:

performing rough, medium, fine, and accurate grinding for surfaces of the rock samples using a lapping machine;

gluing the fine-ground rock samples to micro slides with one side thereof ground to hairy surfaces by applying solid abies balsam to central parts of the micro slides, and squeezing the micro slides firmly using a tweezer such that the colloidal layer is thin, uniform, and free of bubbles;

roughly grinding the glued rock samples using the lapping machine to a thickness of 0.28-0.40 mm, fine grinding the glued rock samples to a thickness of 0.12-0.18 mm, and then accurately grinding the glued rock samples to a thickness of 0.04-0.05 mm; and dropping an appropriate amount of the abies balsam onto the casting thin-sections, lightly heating, carefully placing a cover-slip, and removing bubbles by gently squeezing the cover-slip using the tweezer.

In an exemplary embodiment of the present disclosure, determining the laumontite contents and the development degrees of the pseudo fractures in step 3 includes:

selecting the casting thin-sections from the different rock samples, and capturing a total of 9 pictures under a microscope using an equal probability of 3×3 for a statistical analysis of the laumontite contents; and determining the laumontite content and assessing the development degrees of the development degrees of the pseudo fracture by performing an image analysis on the pictures using the Image-Pro-Plus 6.0 software.

In an exemplary embodiment of the present disclosure, measuring the porosity and permeability of the selected representative rock samples in step 4 includes:

obtaining the overburden pressure porosity and permeability, and the overburden pressure, of the selected representative rock samples using a fully automatic overburden pressure permeability measurement system.

In an exemplary embodiment of the present disclosure, comparing the variations in the porosity and permeability in step 5 includes:

according to the overburden pressure porosity and permeability and overburden pressure obtained in step 4, plotting a comparison diagram of the overburden pressure porosity and permeability between the laumontite-containing reservoir and the laumontite-free reservoir in an area using the Grapher plotting software, with the overburden pressure as a horizontal coordinate and the porosity and permeability as vertical coordinates.

In an exemplary embodiment of the present disclosure, the property correction in step 6 includes:

(1) correcting an influence of pseudo fracture development on the porosity and permeability, a)
$$\Phi_{r1} = \frac{\Phi_p}{0.87} \quad \text{Formula (3)}$$

b)
$$K_{r1} = \frac{K_p}{0.53} \quad \text{Formula (4)}$$

in the formulas, $\Phi_{r1}$ represents a porosity of the laumontite-rich reservoir under a normal temperature and pressure after the correction; $\Phi_p$ represents a porosity of the laumontite-rich reservoir under the overburden pressure of 20 MPa; $K_{r1}$ represents a permeability of the laumontite-rich reservoir under the normal temperature and pressure after the correction; and $K_p$ represents a permeability of the laumontite-rich reservoir under an overburden pressure of 20 MPa; and (2) under a condition that reservoir laumontite development and porosity and permeability values under a ground surface normal temperature and pressure are known, obtaining correction of the porosity and permeability of the laumontite-rich reservoir according to a ratio of physical properties before and after the correction, a)
$$\Phi_{r2} = \frac{\Phi_c}{1.35} \quad \text{Formula (5)}$$

b)
$$K_{r2} = \frac{K_c}{2.07} \quad \text{Formula (6)}$$

in the formulas, $\Phi_{r2}$ represents a porosity of the laumontite-rich reservoir under the normal temperature and pressure after correction of a porosity with an unknown overburden pressure; $\Phi_c$ represents a porosity of the laumontite-rich reservoir under the normal temperature and pressure before the correction; $K_{r2}$ represents a permeability of the laumontite-rich reservoir under the normal temperature and pressure after correction of permeability with an unknown overburden pressure; and $K_c$ represents permeability of the laumontite-rich reservoir under the normal temperature and pressure before the correction.

The principles and beneficial effects of the present disclosure are that: according to the present disclosure, a comprehensive actual geological condition of the laumontite-rich clastic rock reservoir is fully considered, such that the problem that an influence of reservoir permeability of a ground surface is obviously greater than that of actual underground due to the pseudo fracture development caused by rich laumontite in the clastic rock reservoir, is mainly solved, thereby providing a basis for an accurate prediction of the porosity and permeability of a laumontite-rich clastic rock reservoir. Breakthroughs taken by the present disclosure are as follows: (1) according to tests of the overburden pressure porosity and permeability, an actual underground condition of the laumontite-rich reservoir is simulated, and the influence of the pseudo fracture development on the measurement of the porosity and permeability of the reservoir is effectively eliminated; and (2) based on the statistic of the laumontite content in the reservoir, the correction plate of the permeability of the reservoir with different laumontite contents in an overburden pressure condition is established, and a physical property correction of the laumontite-rich reservoir under similar geological background in other areas is effectively guided.

Additional aspects and advantages of the present disclosure will be provided partially in the description below, where some will be apparent from the description below or be understood through the practice of the present disclosure.

DESCRIPTION OF ATTACHED DRAWINGS

The above and/or additional aspects and advantages of the present disclosure will become apparent and easily understood from the following description of examples with reference to the drawings attached below, where:

SPECIFIC EMBODIMENTS

Figure 1:
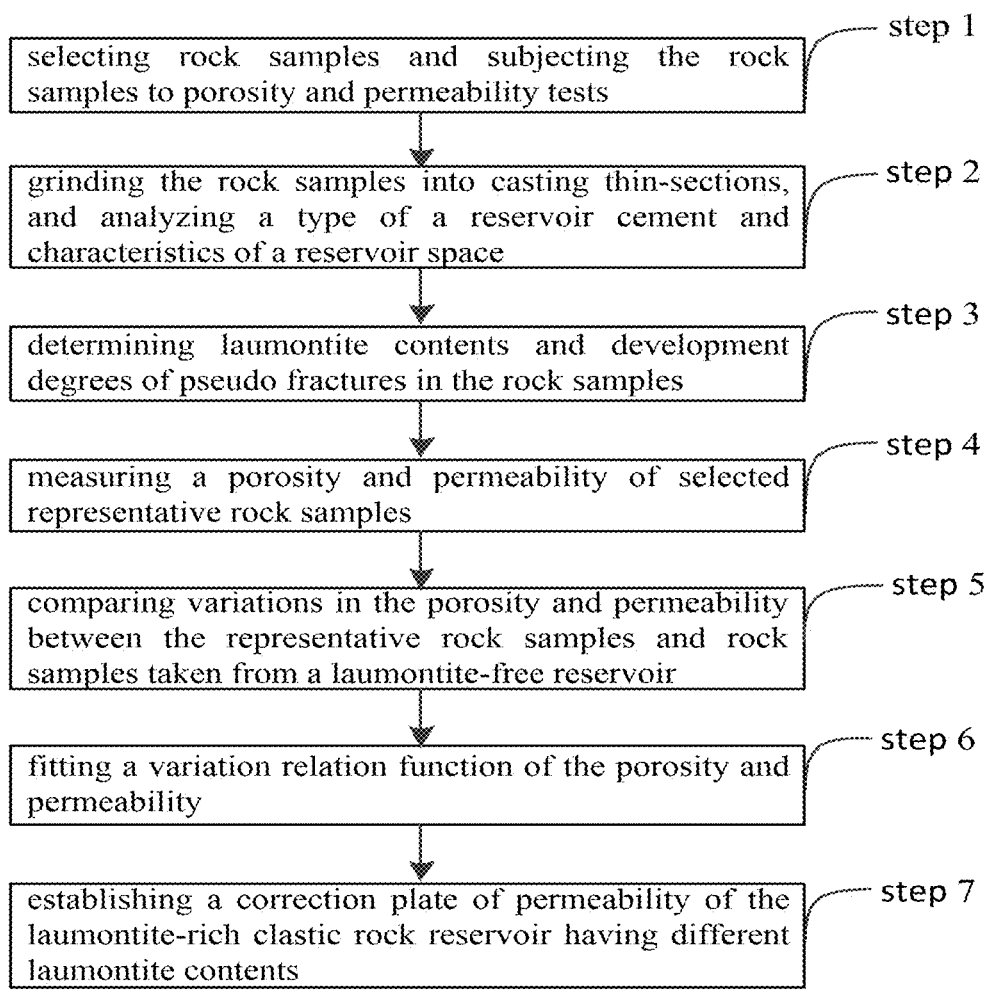
FIG. 1 is a flow diagram of a physical property correction method of a laumontite-rich clastic rock reservoir based on overburden pressure porosity and permeability tests according to the present disclosure.

Some exemplary embodiments of the present disclosure are described in detail below with reference to the accompanying drawings, in which the same or similar elements or elements having the same or similar functions are denoted by the same or similar reference numerals throughout. The embodiments described hereinafter with reference to the accompanying drawings are merely exemplary and illustrative of the present disclosure, and should not be deemed as limiting the scope of the present disclosure.

In the description of the present disclosure, it should be understood that, the orientation or state relations indicated by the terms "longitudinal," "horizontal," "vertical," "up," "down," "front," "rear," "left," "right," "upright," "horizontally," "top," "bottom," "inner," "outer," and the like are based on those shown in the accompanying drawings and merely for the ease of describing the present disclosure and simplifying the description, rather than indicating or implying that the device or element referred to must be in a specific orientation or constructed and operated in a specific orientation, and therefore cannot be interpreted as limiting the present disclosure.

In the description of the present disclosure, it is to be noted that unless otherwise clearly specified and limited, the terms "mounted," "be connected to," and "connection" should be understood in a broad sense. For example, the connection can be mechanical connection, electrical connection, a connection between two components, direct connection, and indirect connection through an intermediate medium. For those ordinary skilled in the art, the specific meanings of the above terms in the present disclosure can be understood according to specific circumstances.

The present application provides a physical property correction method of a laumontite-rich clastic rock reservoir based on overburden pressure porosity and permeability tests. In this embodiment, a specific technical solution of the present disclosure is illustrated using a clastic rock reservoir in an area of the Sichuan Basin as an example. As shown in FIG. 1, the technical solution includes the following steps:

Step 1: rock samples are selected for porosity and permeability tests under a normal temperature and pressure.

A typical drilling rock core of a clastic rock reservoir in the research area is selected and a rock core plug sample (with a diameter of 2.5 cm and a length of 5 cm) is extracted. Afterwards, porosity and permeability tests are carried out separately under normal temperature and pressure conditions.

1. The porosity of a selected rock sample is tested at the normal temperature and pressure by using a plug rock core porosity tester. The test process is as follows: a length and diameter of a prepared rock sample are measured by using a vernier scale, and a total volume of the rock sample is obtained; a pressure regulator is adjusted, and a pore volume under a corresponding gas input pressure is read and is compared with a standard curve and a solid phase volume of the rock sample is obtained; the porosity of the rock sample is quantitatively calculated according to the Boyle's law (Formula 1), wherein a pore volume is obtained by subtracting a particle volume from the total volume of the rock sample.

a)
$$\varphi = \frac{V_p}{V_b} = \frac{V_b - V_g}{V_b} \qquad \text{Formula (1)}$$

In the formula, Vb represents the total volume of the rock sample; Vg represents the volume of the particle; Vp represents the volume of the porosity; and φ is the porosity.

Figure 2:
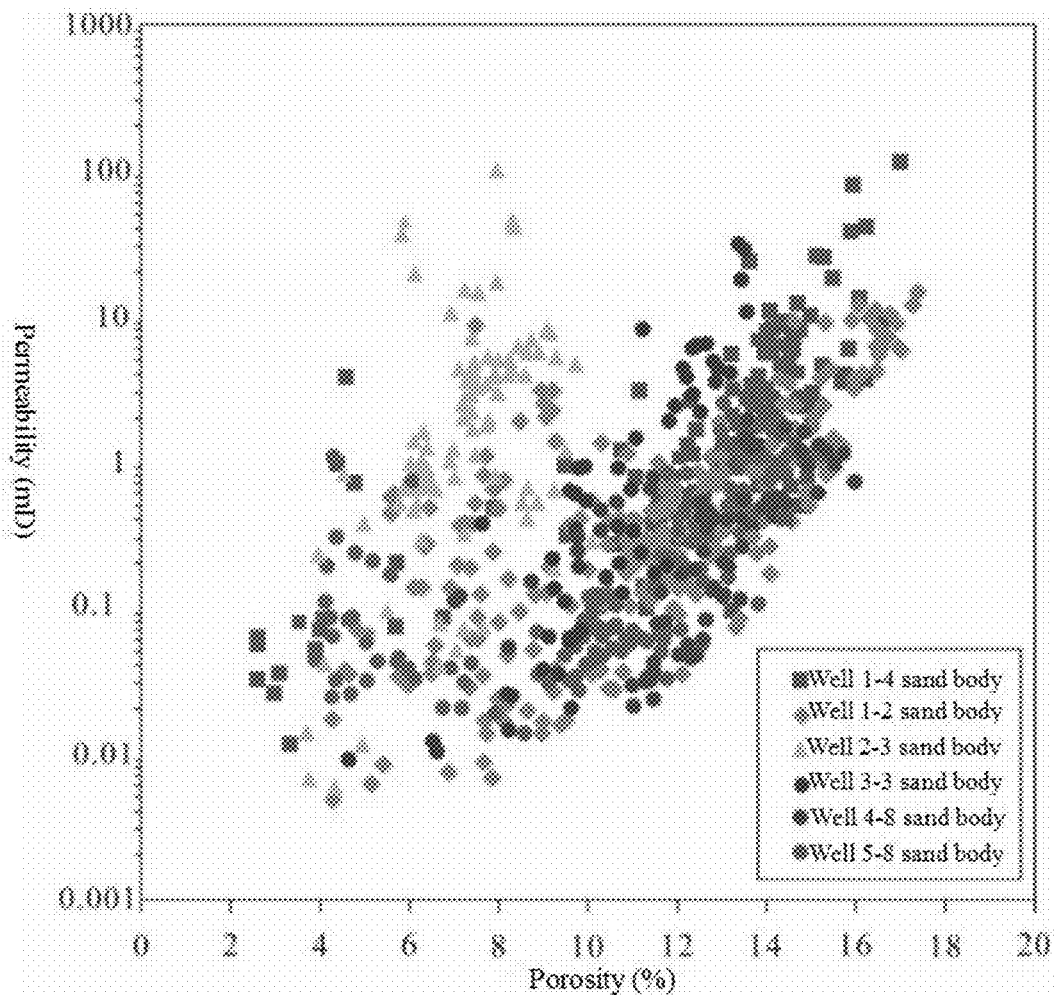
FIG. 2 is a porosity and permeability intersection comparison diagram of a clastic rock reservoir in an area of the Sichuan Basin.

2. The permeability of the selected rock sample is measured by using an STY-III type gas permeability measuring instrument. The test process is as follows: the length and diameter of the prepared rock sample are measured by using the vernier scale, and a cross-sectional area is calculated; gas (helium) with a known viscosity is made to flow through a rock sample with a known size, and a pressure difference and a flow rate are measured; an inlet pressure and an outlet pressure are measured by using a pressure gauge; a gas flow is measured by using a calibrated vent hole, and gas permeability of the rock sample is calculated (according to Formula 2). Through an experiment, porosity and permeability values of the reservoir under the normal temperature and pressure are obtained. Taking the porosity as a horizontal coordinate and the permeability as a vertical coordinate, a porosity and permeability intersection comparison diagram of a clastic rock reservoir in an area of the Sichuan Basin is plotted using the Grapher plotting software, as shown in FIG. 2.

a)
$$K = \frac{2\mu Q L P_0}{A(P_1^2 - P_2^2)} \times 10^{-1} \qquad \text{Formula (2)}$$

In the formula, K represents the gas permeability of the rock sample, in the unit of $\mu m^2$; A represents the cross-sectional area of the rock sample; L represents the length of the rock sample, in the unit of cm; u represents the gas viscosity, in the unit of mPa·S; Q represents the gas flow at an absolute atmospheric pressure, in the unit of $cm^3/s$; $P_0$ represents an atmospheric pressure, in the unit of MPa; $P_1$ represents the inlet pressure of the rock sample, in the unit of MPa; and $P_2$ represents the outlet pressure of the rock sample, in the unit of MPa.

Step 2: Rock samples for a physical property analytic test are ground into casting thin-sections, and a type of a reservoir cement is analyzed.

Figure 3A:
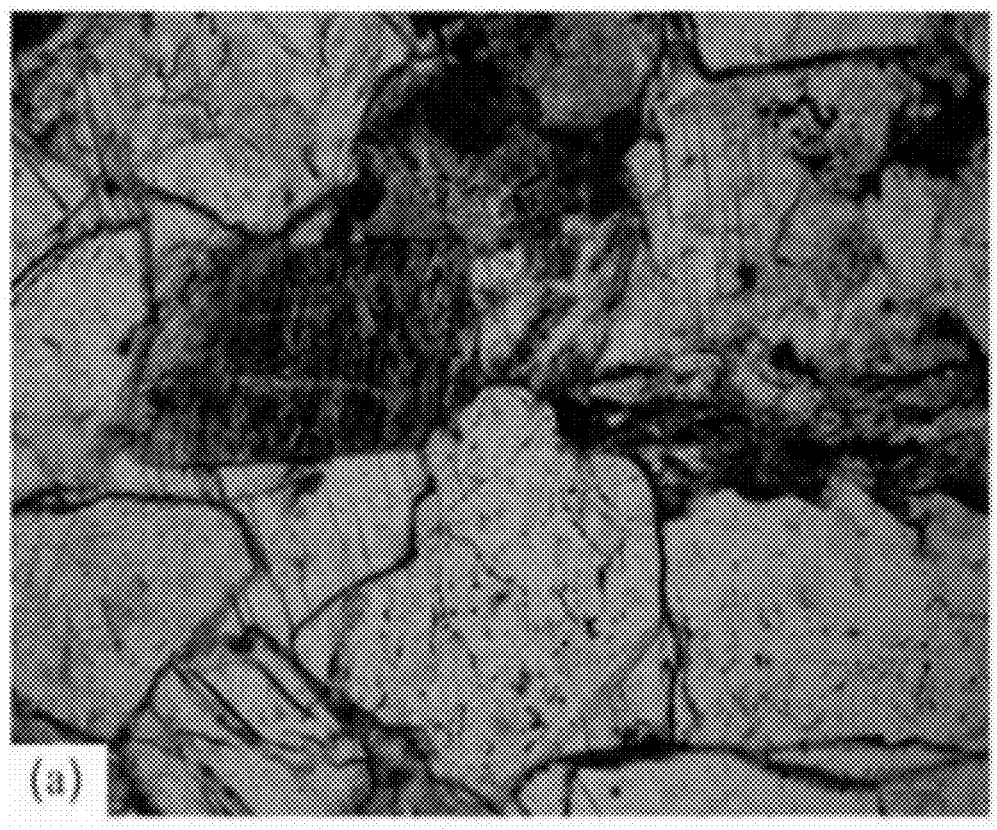
FIG. 3a and FIG. 3b are feature comparison diagrams of a laumontite of a clastic rock reservoir under a microscope in an area of the Sichuan Basin.

1. The type of the reservoir cement in the research area is determined and analyzed by using a casting body image analysis system. Preparation and test processes of a sample are as follows: a sample corresponding to the clastic rock reservoir in the research area is sliced (with a diameter of 25 mm, and a thickness of 2-3.5 mm); vacuum perfusion and pressure perfusion are performed on the rock sample by using a casting instrument; rough, medium, fine and accurate grindings are performed on a plane of the rock sample by using a lapping machine; a central part of a micro slide, where one side is ground to a hairy surface, is glued with a fine ground rock sample by using a solid abies balsam, and the micro slide is squeezed with a tweezer to make an colloidal layer thin, uniform and free of bubbles; a glued rock sample is roughly ground in the lapping machine to 0.28-0.40 mm, finely ground to 0.12-0.18 and accurately ground to 0.04-0.05 mm; the casting thin-section is dripped with a proper amount of the abies balsam, heated slightly, placed with a cover-slip, and the cover-slip is gently squeezed with the tweezer to remove bubbles. The laumontite cement develops in the clastic rock reservoir in the research area. Under a polarizing microscope, the laumontite is colorless under a plane-polarized light, mostly fills pores in a contiguous poikilitic shape and with a negative low rise, and is characterized by a group of complete cleavage, partially, two groups of near-direct complete cleavage or no cleavage can be seen, as shown in FIG. 3a. Under a crossed polarizer, the laumontite has a grayish-white to yellow interference color and oblique extinction.

Figure 3B:
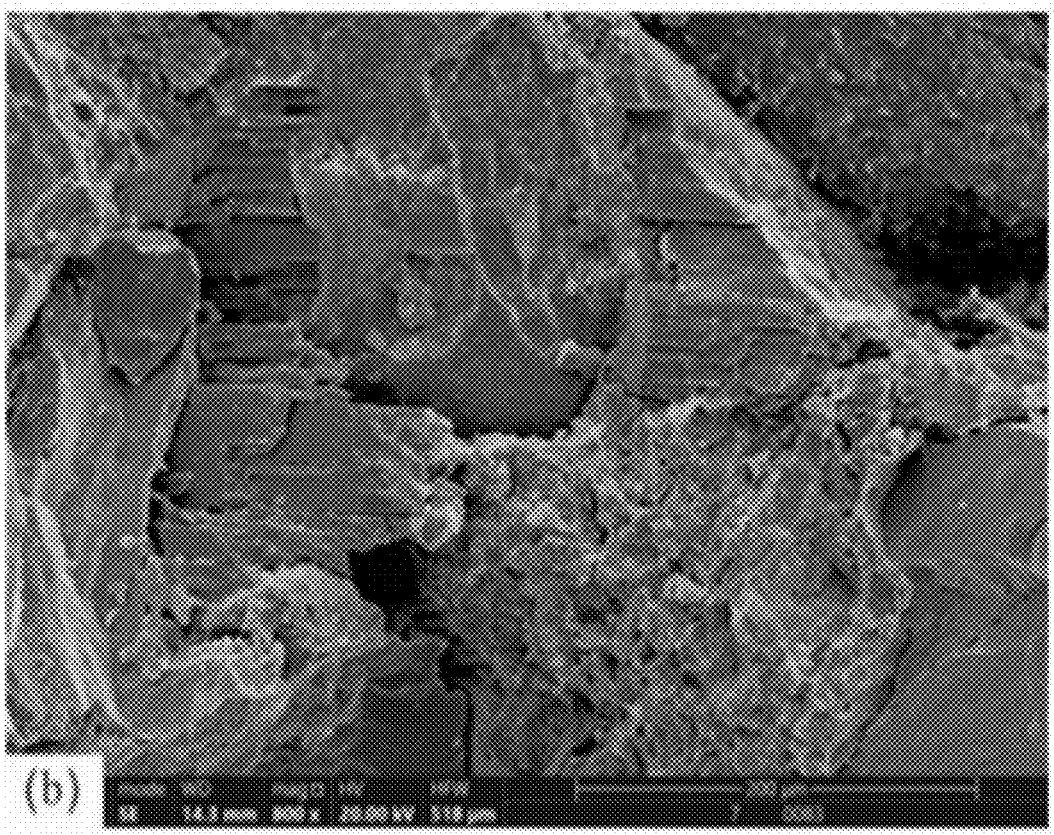

2. Quantitative research is performed on the type of the reservoir cement in the research area using an electronic probe X-ray microscopic analyzer. In the process of an analysis by an electronic probe, to obtain a better spatial resolution, a sample micro-region is bombed by using a fine-focus high-energy electron beam (15 kV) with a diameter of 5 μm, and X-rays with different composition element features are excited in a sample surface irradiation region; a wavelength and intensity of the feature X-rays are measured by using a wavelength-dispersive spectrometer (or an energy dispersive spectroscopy) and a detection counting system; and the wavelength and strength of X-rays are converted into a qualitative and quantitative element type and element content information (show in Table 1). By analyzing chemical contents of main components and minor components of the laumontite (shown in Table 1), it is known that a chemical formula of the laumontite is $Ca[AlSi_2O_6]_2 \cdot 4H_2O$. In addition, it can be seen from a scanning electron microscope that a blocky laumontite fills pores, and cleaves and develops, and is easy to corrode along a cleavage seam, as shown in FIG. 3b.

TABLE 1

Data summarization of the chemical composition of laumontite in a reservoir in an area of the Sichuan Basin

| Well number | Point mark | Well depth/m | Chemical composition/% | | | | | | | | |
|---|---|---|---|---|---|---|---|---|---|---|---|
| | | | $SiO_2$ | $Al_2O_3$ | FeO | MnO | MgO | CaO | $Na_2O$ | $K_2O$ | SrO | Total |
| Well 2 | 1 | 2,668.48 | 52.78 | 20.69 | 0.06 | 0.01 | 0.01 | 12.15 | 0.21 | 0.13 | 0.00 | 86.04 |
| Well 2 | 2 | 2,668.48 | 53.62 | 20.46 | 0.16 | 0.00 | 0.04 | 12.03 | 0.199 | 0.11 | 0.00 | 86.61 |
| Well 2 | 3 | 2,668.48 | 52.76 | 20.37 | 0.05 | 0.01 | 0.02 | 11.98 | 0.18 | 0.15 | 0.00 | 85.51 |
| Well 3 | 1 | 1,935.8 | 52.78 | 20.70 | 0.06 | 0.00 | 0.01 | 12.15 | 0.21 | 0.13 | 0.00 | 86.04 |
| Well 3 | 2 | 1,935.8 | 53.62 | 20.46 | 0.16 | 0.00 | 0.04 | 12.03 | 0.19 | 0.11 | 0.00 | 86.61 |
| Well 3 | 3 | 1,935.8 | 52.76 | 20.37 | 0.05 | 0.00 | 0.02 | 11.98 | 0.18 | 0.15 | 0.00 | 85.51 |

Step 3: Laumontite contents of the reservoir and development degrees of pseudo fractures are determined.

Figure 4A:
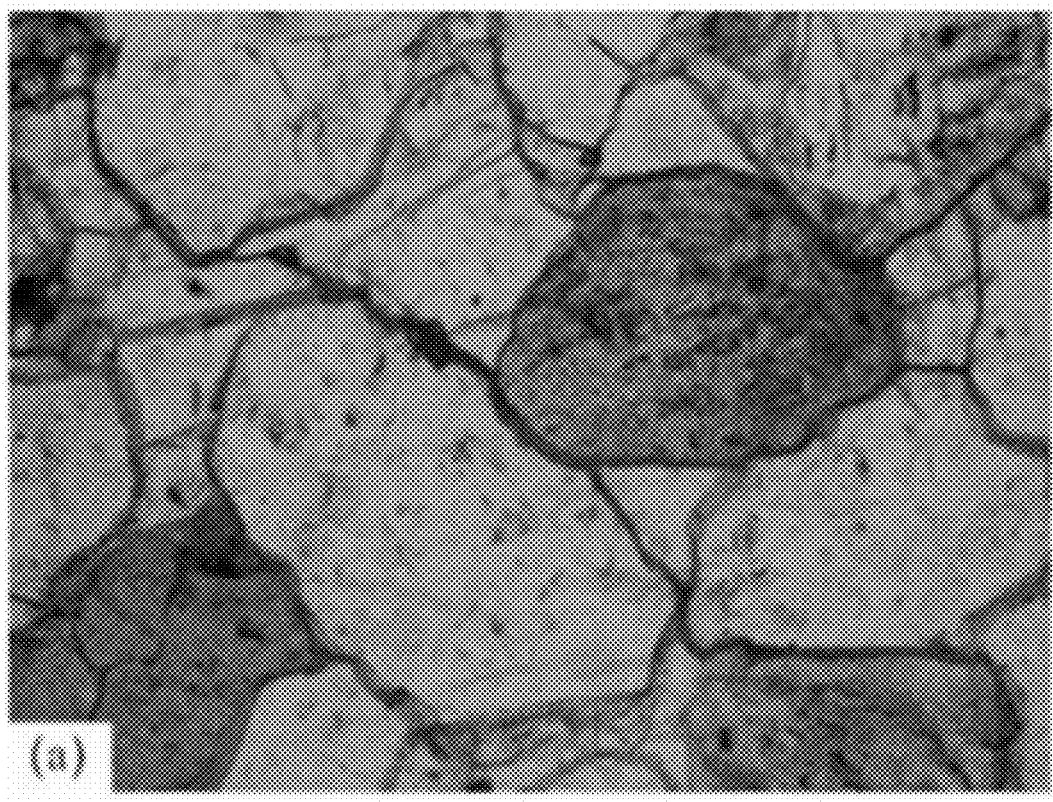
FIG. 4a, FIG. 4b, FIG. 4c and FIG. 4d are comparison diagrams of the pseudo-fracture development of a clastic rock reservoir with different laumontite contents in an area of the Sichuan Basin.
Figure 4B:
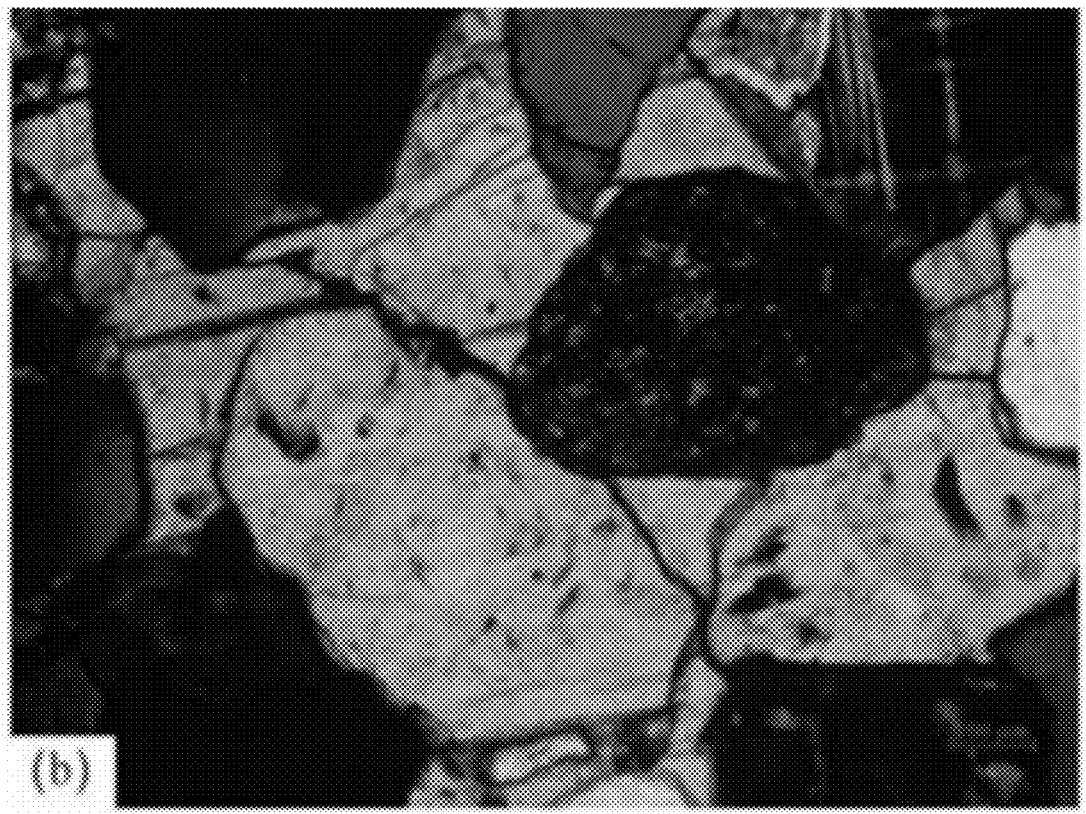
Figure 4C:
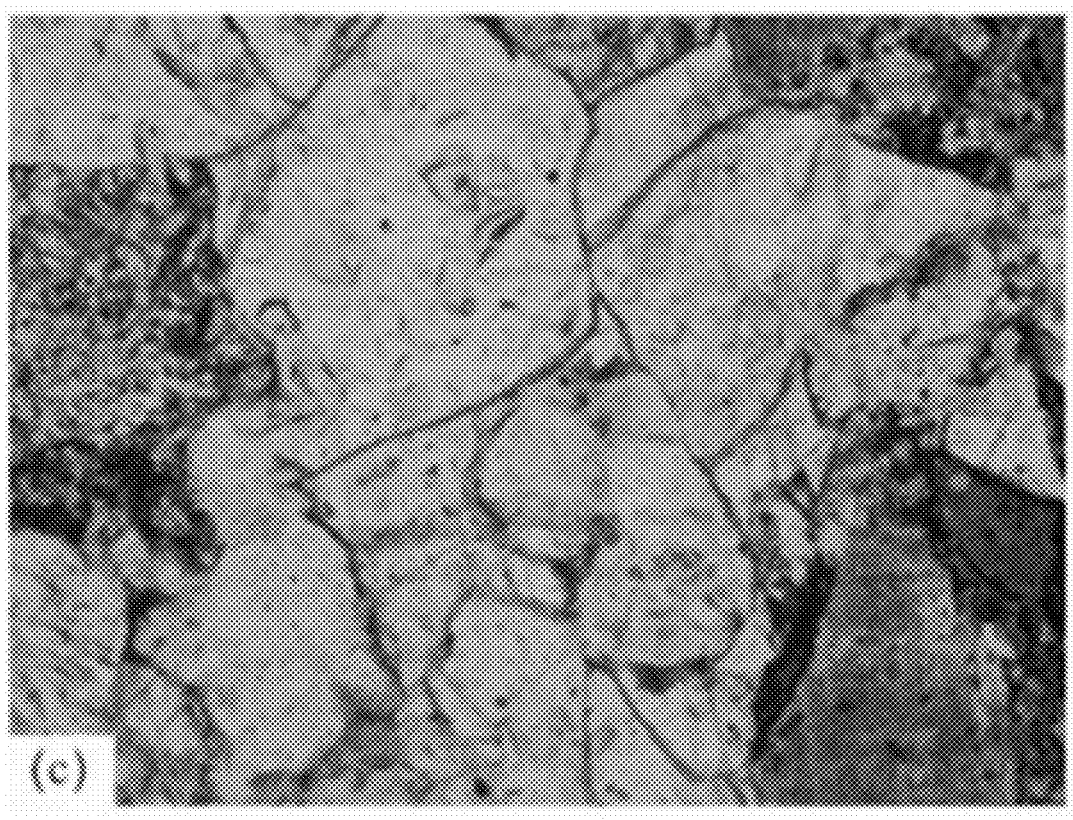
Figure 4D:
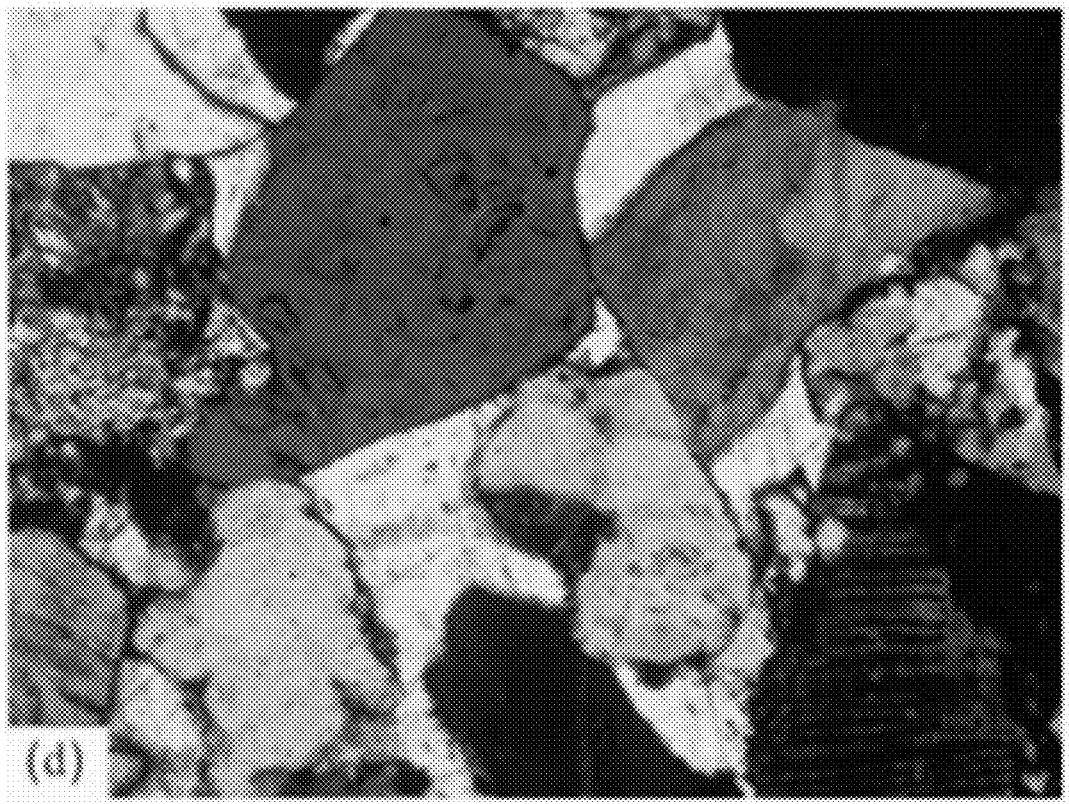

The laumontite is widely developed in the clastic reservoir in the research area, but the laumontite content is significantly different in different reservoirs. The casting thin-sections of different rock samples are selected, and a total of 9 pictures are taken at an equal probability of 3×3 under a microscope for a statistical analysis of the laumontite content; an image analysis on the picture is performed by using an Image-Pro-Plus6.0 software. According to analysis results of a laumontite content image in a corresponding rock sample, the laumontite content of the reservoir in the research area is divided into three intervals from less to more: 0<the laumontite content<3%, 3%≤the laumontite content<6%, and the laumontite content≥6%. According to the divided laumontite content interval, the casting thin-section with corresponding content is selected. In the case that the laumontite content≥6%, the pseudo fracture, caused by the laumontite development, in the clastic particle edge is obvious, as shown in FIG. 4a and FIG. 4b; and in the case that 0<the laumontite content<3%, the pseudo fracture of the laumontite is not obvious, as shown in FIG. 4c-d.

Step 4: Overburden pressure porosity and permeability tests are performed by selecting a representative rock sample.

In combination with the analysis of the laumontite content of the clastic rock reservoir in the research area and a porosity and permeability cross plot, as shown in FIG. 2, the rock sample with different laumontite contents is selected as a representative rock sample to perform overburden pressure porosity and permeability tests. The overburden pressure porosity and permeability tests are performed on the selected rock sample using a fully automatic overburden pressure porosity and permeability measurement system, and an experimental process is the same as that in step 1. An overlying pressure is adjusted by using an electronically controlled fluid injection pump such that the overburden pressure is 2, 4, 6, 8, 10, 15, 20, 25, 30, and 35 MPa in sequence. After each pressure point is stabilized, the numerical value is recorded. The porosity is measured by the Boyle's law (formula 1), and the permeability is measured by an unsteady pulse attenuation technique, such that various parameters are obtained, including an overlying formation pressure (confining pressure), a fully-automatic instrument-measured permeability, a fully-automatic instrument-measured porosity, and the like.

Step 5: Variations of the porosity and permeability between a laumontite-containing reservoir and a laumontite-free reservoir under the overburden pressure condition are compared.

Figure 5:
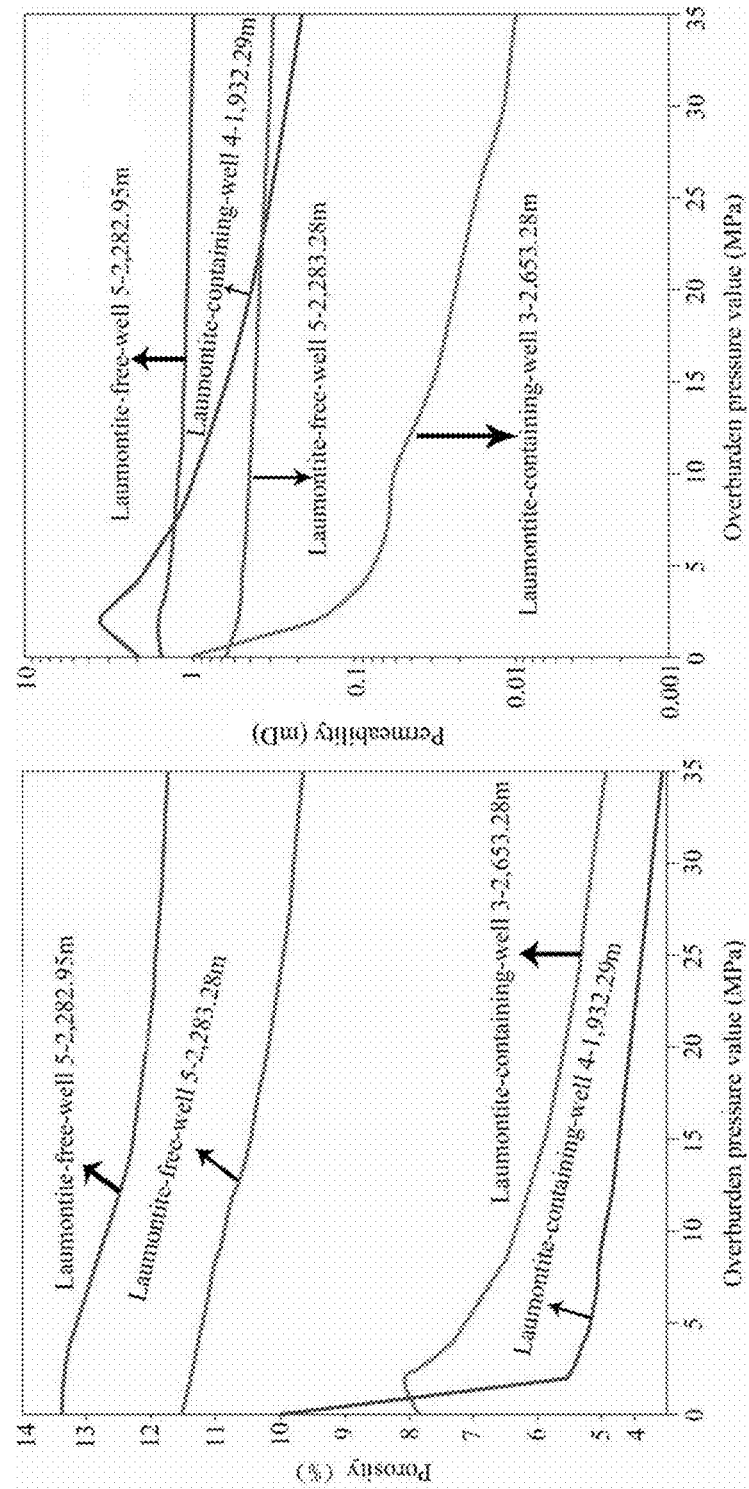
FIG. 5 is a comparison diagram of overburden pressure permeability of a laumontite-containing reservoir and a laumontite-free reservoir in an area of the Sichuan Basin.

According to reservoir porosity and permeability values under the overburden pressure obtained in step 4, taking the overburden pressure as a horizontal coordinate, and the porosity and permeability as vertical coordinates separately, a comparison diagram of the porosity and permeability, under the overburden pressure, of the laumontite-containing reservoir and the laumontite-free reservoir in the area of the Sichuan Basin is plotted by using a Grapher plotting software, as shown in FIG. 5, wherein well 1, well 2 and well 3 are rich in laumontite, and well 4 and well 5 are free of laumontite. Considering that an actual stratum overlying pressure in the research area reaches 20 MPa, when the clastic rock reservoir is free of laumontite, and the overburden pressure is increased from 0 MPa to 20 MPa, a maximum decrease of the porosity is 11.8% and a maximum decrease of the permeability is 40.6%; and when the clastic rock reservoir is rich in laumontite, the maximum decrease of the porosity is 54.2%, and the maximum decrease of the permeability is 97.9%. By comparison of the results, it can be seen that porosity and permeability variations of a laumontite-rich clastic rock reservoir rock sample under the overburden pressure condition are more obvious.

Figure 6A:
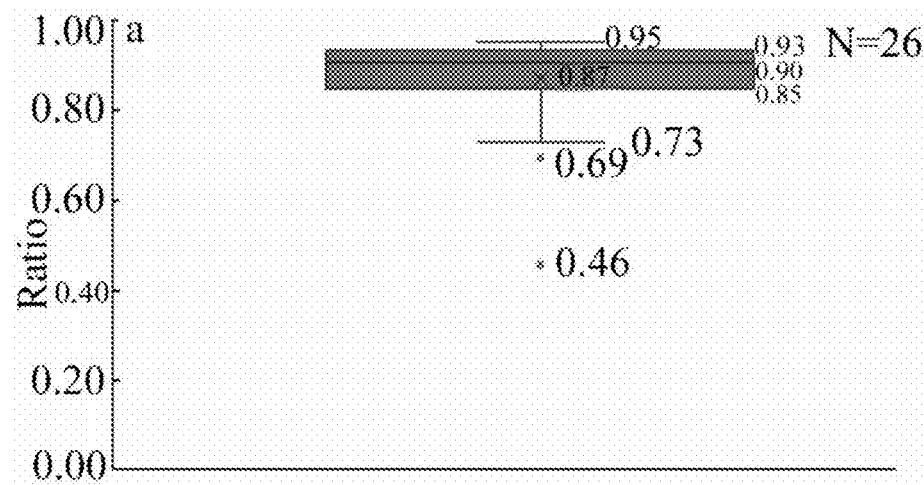
FIG. 6a, FIG. 6b, FIG. 6c and FIG. 6d are porosity and permeability intersection comparison diagrams of a clastic rock reservoir in an area of the Sichuan Basin before and after correction.
Figure 6B:
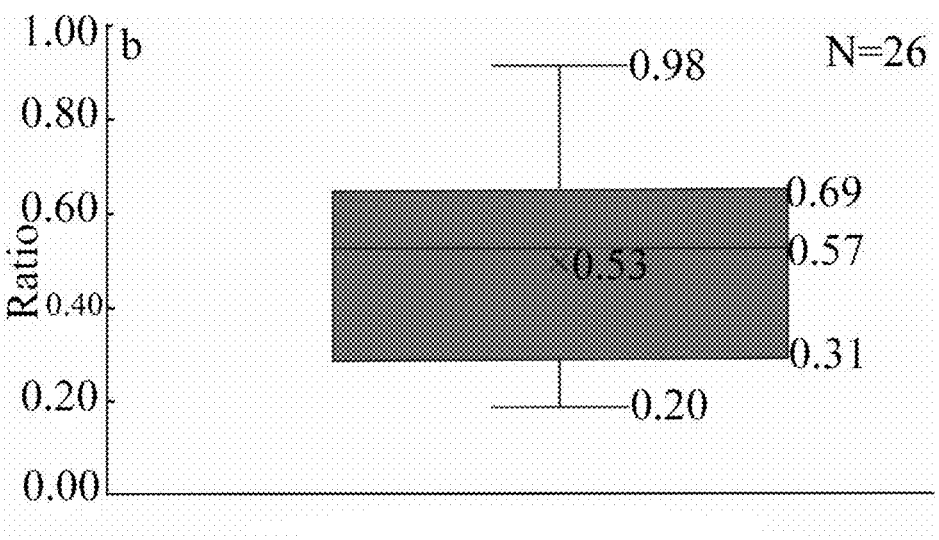
Figure 6C:
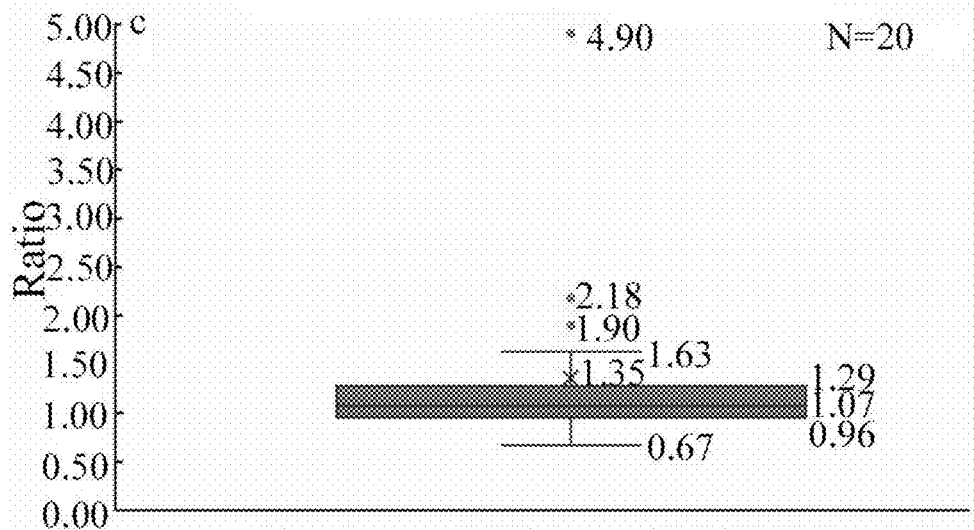
Figure 6D:
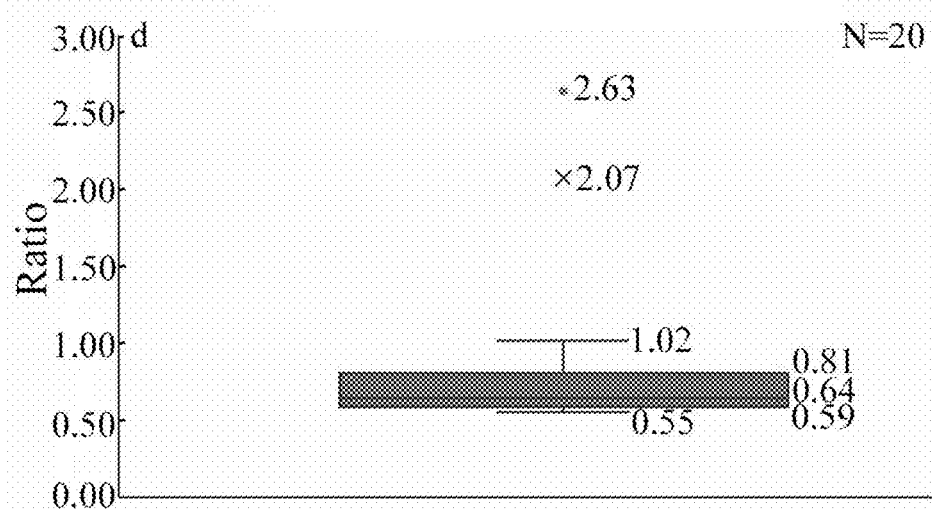

Step 6: A laumontite-rich reservoir porosity and permeability correction model is established according to the obtained reservoir porosity and permeability data (including parameters such as the porosity and permeability of the clastic rock reservoir under the normal temperature and pressure, the porosity and permeability, overburden pressure, and the like of the reservoir obtained by an overburden pressure experiment). For the laumontite-free reservoir, ratios of the porosity and permeability under a corresponding actual stratum condition (the overburden pressure is 20 MPa) to the porosity and permeability under a ground surface normal temperature and pressure are calculated separately by using a computational software, and average values, that are 0.88 and 0.53 respectively, of the obtained porosity and permeability ratios are further calculated. According to information provided in a box plot, it is known that the centrality of the porosity and permeability ratio is better, as shown in FIG. 6a and FIG. 6b. In this case, it is considered that in the absence of the pseudo fracture development in the reservoir, ratios of porosity and permeability values under the 20 MPa overburden pressure to porosity and permeability values under normal temperature and pressure conditions tend to be constant. Under the actual stratum condition (the overburden pressure is 20 MPa), the laumontite-containing reservoir has no pseudo-fracture development. Therefore, according to porosity and permeability values of the laumontite-rich reservoir under a condition that the overburden pressure is 20 MPa, porosity and permeability values of the laumontite-rich reservoir without pseudo fracture development under normal temperature and pressure conditions are calculated (Formula 3 and Formula 4), such that the influence of the pseudo fracture development on the porosity and permeability is corrected.

a)
$$\Phi_{r1} = \frac{\Phi_p}{0.87} \quad \text{Formula (3)}$$

b)
$$K_{r1} = \frac{K_p}{0.53} \quad \text{Formula (4)}$$

In the formulas, $\Phi_{r1}$ represents a porosity of the laumontite-rich reservoir under the normal temperature and pressure after the correction; $\Phi_p$ represents a porosity of the laumontite-rich reservoir under the overburden pressure of 20 MPa; $K_{r1}$ represents a permeability of the laumontite-rich under the normal temperature and pressure after correction; and $K_p$ represents a permeability of the laumontite-rich reservoir under an overburden pressure of 20 MPa.

Generally, the ground surface is mainly used to test porosity and permeability values under normal temperature and pressure, and data on reservoir overburden porosity and permeability are scarce. There is a correlation between porosity and permeability values corrected according to overburden pressure test data and porosity and permeability values under normal temperature and pressure. An average value of the ratio of porosity and permeability values to the corrected porosity and permeability values under the normal temperature and pressure is calculated, and the average is 1.29 and 2.07, respectively. According to the information provided by the box plot, it is known that the centrality of porosity and permeability ratio is better, as shown in FIG. 6a and FIG. 6b. In this case, it is considered that the influence of the pseudo fracture formed by the development of the laumontite on the porosity and permeability of the reservoir tends to be consistent, that is, the ratios before and after correction tend to be constant. Under a condition that only the development of the laumontite and the porosity and permeability value of the reservoir under the ground surface normal temperature and pressure are known, correction on the porosity and permeability of the laumontite-rich reservoir is obtained according to physical property ratios before and after the correction (Formula 5 and Formula 6).

a)
$$\Phi_{r2} = \frac{\Phi_c}{1.35} \quad \text{Formula (5)}$$

b)
$$K_{r2} = \frac{K_c}{2.07} \quad \text{Formula (6)}$$

In the formulas, $\Phi_{r2}$ represents a porosity of the laumontite-rich reservoir under the normal temperature and pressure after correction of a porosity with an unknown overburden pressure; $\Phi_c$ represents a porosity of the laumontite-rich reservoir under the normal temperature and pressure before the correction; $K_{r2}$ represents a permeability of the laumontite-rich reservoir under the normal temperature and pressure after correction of a permeability with an unknown overburden pressure; and $K_c$ represents a permeability of the laumontite-rich reservoir under the normal temperature and pressure before correction.

Figure 7A:
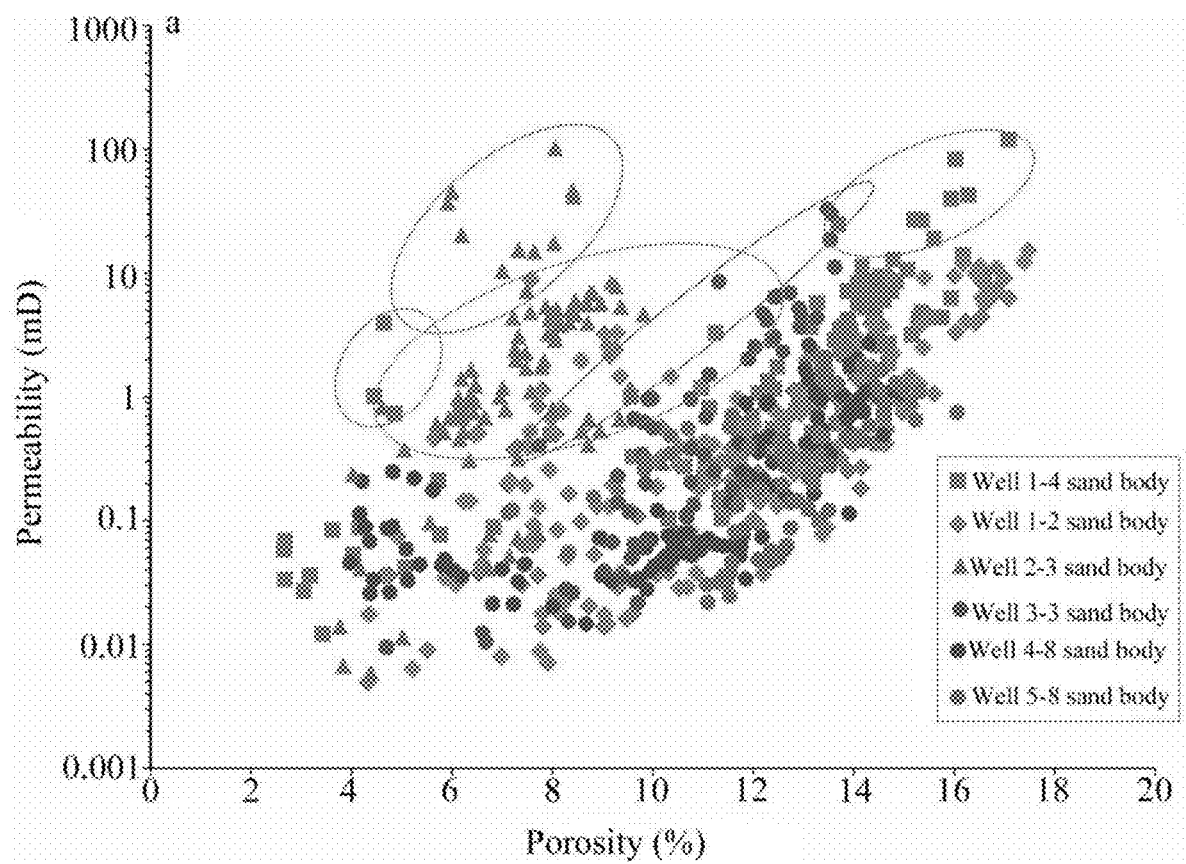
FIG. 7a and FIG. 7b are porosity and permeability intersection comparison diagrams of a clastic rock reservoir in an area of the Sichuan Basin before and after correction.
Figure 7B:
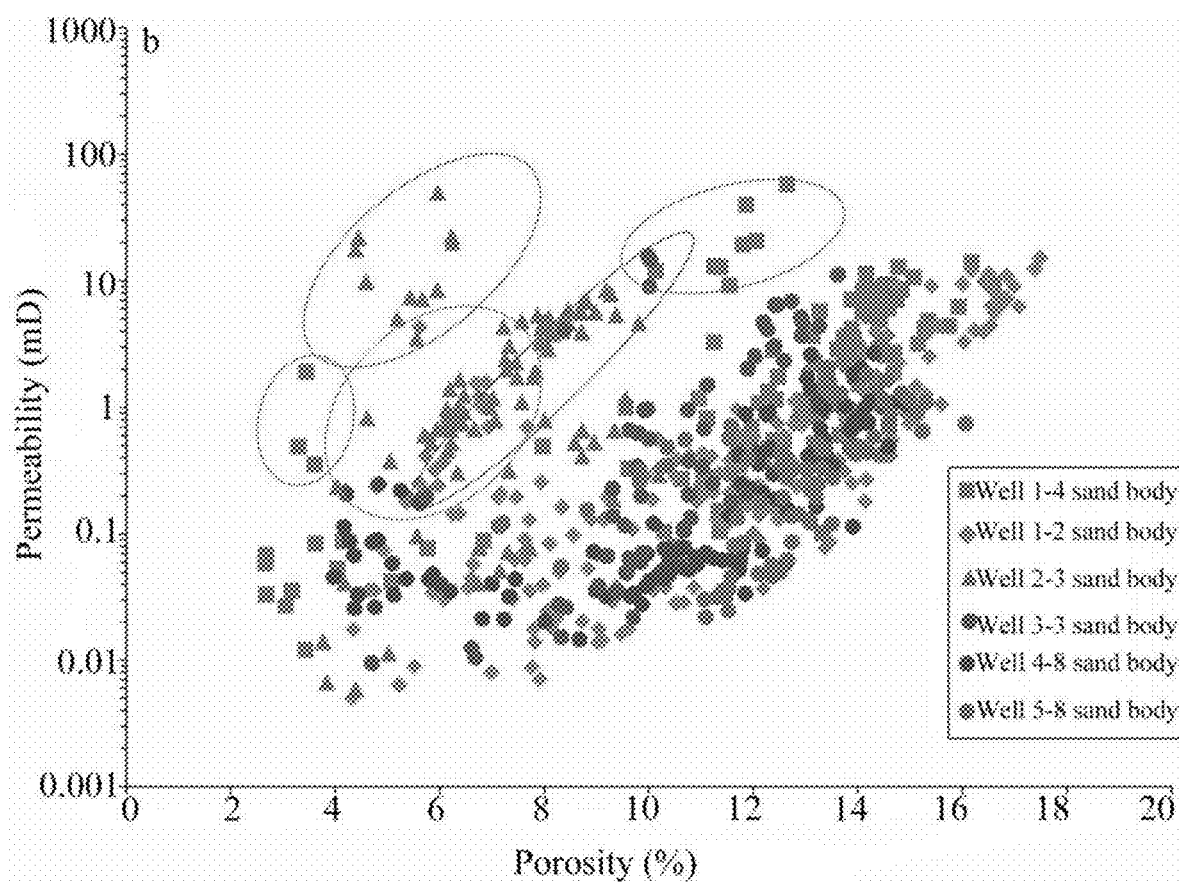

According to the obtained correction model, abnormal data points of low porosity and high permeability appearing in the laumontite-rich reservoir are corrected, as shown in FIG. 7a, such that the porosity and permeability under the normal temperature and pressure after correction can be obtained. Taking a corrected porosity as the horizontal coordinate and corrected permeability as the vertical ordinate, a cross pot of the porosity and permeability, after correction, of the clastic rock reservoir in the area of the Sichuan Basin is plotted by using the Grapher plotting software, as shown in FIG. 7b, the physical properties before and after correction are significantly different.

Step 7: A correction plate of the permeability of the reservoir with different laumontite contents is established by comparing variations of the porosity and permeability of the reservoir with different laumontite contents under the overburden pressure condition.

Figure 8:
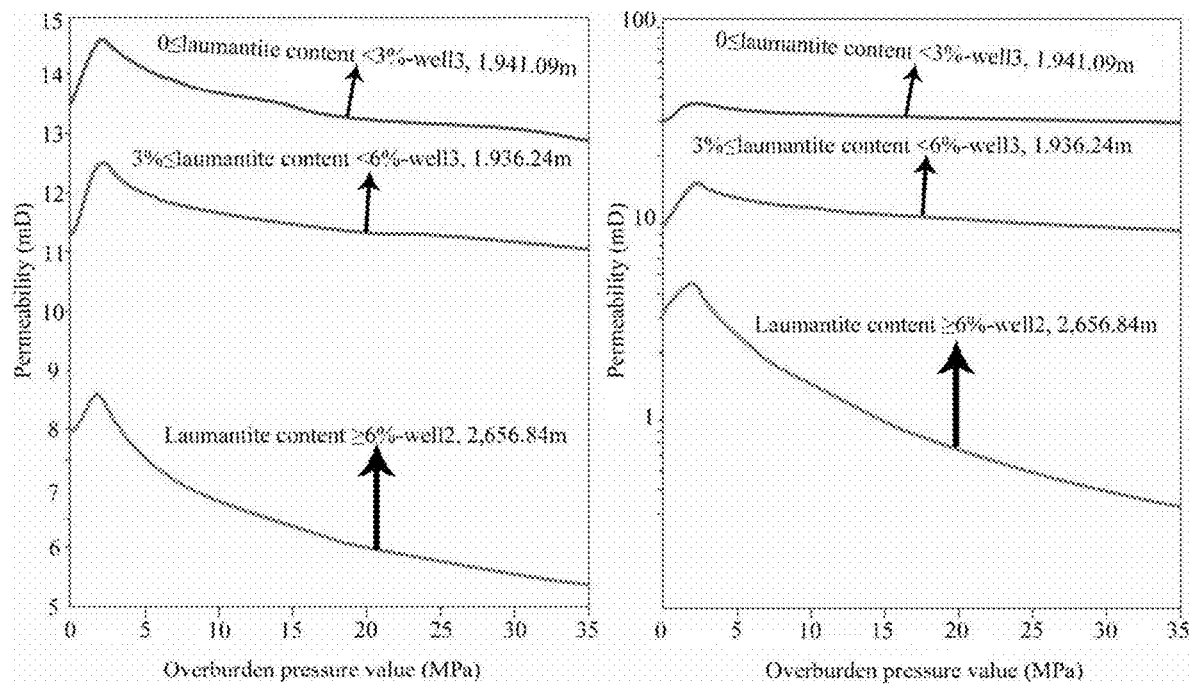
FIG. 8 is a comparison diagram of a porosity and permeability of a clastic rock reservoir with different laumontite contents in an area of the Sichuan Basin.

1. According to the laumontite content interval contained in the clastic rock reservoir in the research area in step 3, rock samples with different laumontite content intervals are selected correspondingly, and analysis is performed on rock samples by using the porosity, the permeability, the overburden pressure and the like of the reservoir under the overburden pressure obtained in step 4. Taking the overburden pressure as the horizontal coordinate, and the reservoir porosity and permeability as vertical coordinates separately, a comparison diagram of the porosity and permeability of the reservoir with different laumontite contents in the area of the Sichuan Basin is plotted, as shown in FIG. 8, by using the Grapher plotting software. Considering that the actual stratum overlying pressure in the research area reaches 20 MPa, when the overburden pressure is increased from 0 MPa to 20 MPa, and the laumontite content is ≥6%, the maximum reduction of the porosity is 23.8%, and the maximum reduction of the permeability reduction is 80%. When 3%≤the laumontite content<6%, the maximum reduction of the porosity is 16.7%, and the maximum reduction of the permeability is 33.0%. When 0<the laumontite content<3%, the maximum reduction of the porosity is 5.8%, and the maximum reduction of the permeability is 6.2%. Through comparison, it can be seen that physical property characteristics of the reservoir are closely related to the laumontite content, and a reduced amplitude of the porosity and permeability of the clastic rock reservoir increases with the increase of the laumontite content.

Figure 9:
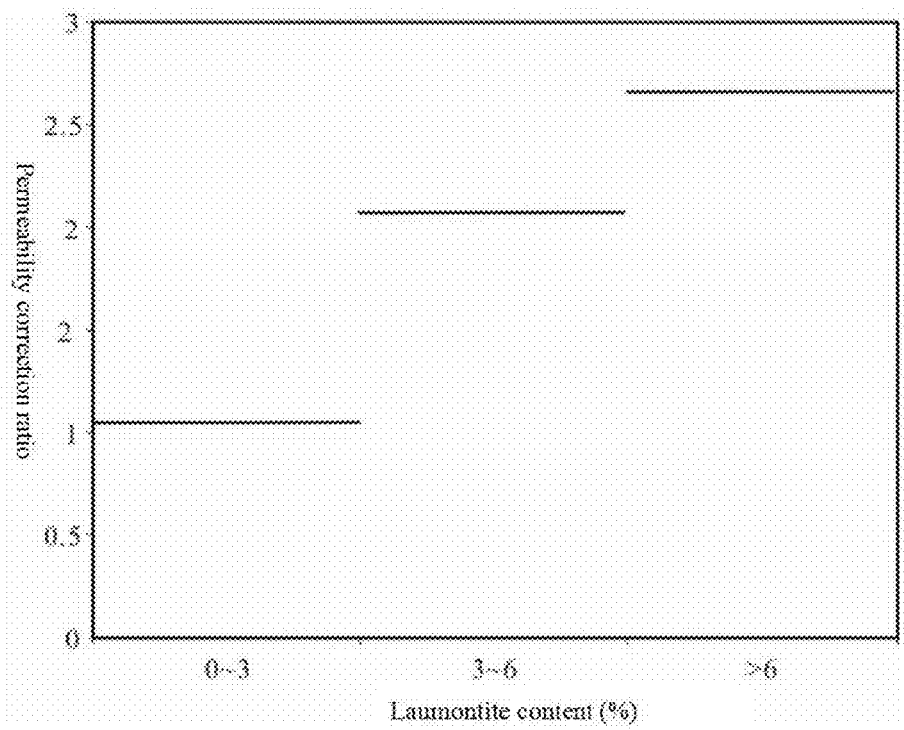
FIG. 9 is a permeability correction ratio variation chart of a reservoir with different laumontite contents in an area of the Sichuan Basin.

According to the permeability correction model of the laumontite-rich reservoir in step 6 (Formula 4), a corrected permeability of a corresponding laumontite-rich reservoir rock sample under the normal temperature and pressure is calculated under the overburden pressure of 20 MPa. In combination with the laumontite content interval contained in the clastic rock reservoir in the research area in step 3, an average ratio of the permeability under the normal temperature and pressure before correction to the permeability under the normal temperature and pressure after correction in each laumontite content interval of the reservoir is calculated. Taking the laumontite content interval as the horizontal coordinate, the average ratio of the permeability under the normal temperature and pressure before correction to the permeability under the normal temperature and pressure after correction of different laumontite content intervals is taken as the vertical coordinate, a permeability variation chart of the reservoirs with different laumontite contents is plotted, as shown in FIG. 9, by using the Grapher plotting software. This changing trend can provide a reference for the physical property correction of laumontite-rich clastic reservoirs in other basins.

In the description of the specification, reference terms "a preferred embodiment," "one example," "some examples," "a typical example," "a specific typical example," or "some typical examples" mean that a particular feature, structure, material, or characteristic described in combination with the example or typical example is included in at least one example or typical example of the present disclosure. In the specification, an indicative expression of the above terms does not necessarily refer to the same example or typical example. Furthermore, the particular feature, structure, material, or characteristic described may be combined in any suitable manner in any one or more of examples or typical examples.

Although the examples of the present disclosure have been shown and described, those ordinary skilled in the art can understand that: various changes, modifications, replacements and variations can be made on these examples within the principle and spirit of the present disclosure. The scope of the present disclosure is defined by the attached claims and the equivalents thereof.

What is claimed is:

1. A method for correcting measurement values of physical properties of laumontite-rich clastic rock reservoirs that are obtained based on overburden pressure porosity and permeability tests, comprising:
    step 1: selecting rock samples taken from a laumontite-rich clastic rock reservoir in a research area and subjecting the rock samples to porosity and permeability tests under a normal temperature and pressure condition;
    step 2: grinding the rock samples into casting thin-sections, and analyzing a type of a reservoir cement and characteristics of a reservoir space corresponding to the rock samples taken therefrom;
    step 3: determining laumontite contents and development degrees of pseudo fractures in the rock samples having different laumontite contents;
    step 4: measuring a porosity and permeability of selected representative rock samples having the different laumontite contents under an overburden pressure condition;
    step 5: comparing variations in the porosity and permeability between the selected representative rock samples taken from the laumontite-rich clastic rock reservoir and rock samples taken from a laumontite-free reservoir under the overburden pressure condition;
    step 6: fitting a variation relation function of the porosity and permeability of the selected representative rock samples taken from the laumontite-rich clastic rock reservoir and the rock samples taken from the laumontite-free reservoir under the overburden pressure condition to derive a correction; and
    step 7: establishing a correction plate of permeability of the laumontite-rich clastic rock reservoir having different laumontite contents by comparing the variations in the porosity and permeability corresponding to the rock samples taken from the laumontite-rich clastic rock reservoir having the different laumontite contents under the overburden pressure condition.

2. The method according to claim 1, wherein the porosity test in step 1 comprises:
    preparing a selected rock sample and determining a total volume of the prepared rock sample by measuring a length and diameter of the prepared rock sample using a vernier caliper;
    reading a pore volume of the rock sample under a corresponding gas input pressure by adjusting a pressure regulator;
    determining a solid phase volume of the rock sample by comparing the pore volume with a standard curve; and
    quantitatively calculating the porosity of the rock sample according to the Boyle's law;
    wherein the pore volume is obtained by subtracting a particle volume from the total volume of the rock sample, and the porosity is calculated according to the following formula:

$$\varphi = \frac{V_p}{V_b} = \frac{V_b - V_g}{V_b} \qquad \text{Formula (1)}$$

wherein $V_b$ represents the total volume of the rock sample; $V_g$ represents the particle volume; $V_p$ represents the pore volume; and φ represents the porosity.

3. The method according to claim 2, wherein the permeability test in step 1 comprises:
    calculating a cross-sectional area by measuring the length and diameter of the prepared rock sample using the vernier caliper;
    measuring a pressure difference and a flow rate by allowing helium with a known viscosity to flow through a rock sample with a known size;
    measuring an inlet pressure and an outlet pressure using a pressure gauge; and
    measuring a gas flow by using a calibrated vent hole to calculate a gas permeability of the rock sample, wherein the gas permeability is calculated according to the following formula:

$$K = \frac{2\mu Q L P_0}{A(P_1^2 - P_2^2)} \times 10^{-1} \qquad \text{Formula (2)}$$

wherein K represents a permeability of the rock sample, in the unit of $\mu m^2$; A represents a cross-sectional area of the rock sample, in the unit of $cm^2$; L represents a length of the rock sample, in the unit of cm; $\mu$ represents a gas viscosity, in the unit of mPa·S; Q represents a gas flow under an absolute atmospheric pressure, in the unit of $cm^3/s$; $P_0$ represents an atmospheric pressure, in the unit of MPa; $P_1$ represents an inlet pressure of the rock sample, in the unit of MPa; and $P_2$ represents an outlet pressure of the rock sample, in the unit of MPa.

4. The method according to claim 3, wherein grinding the rock samples into the casting thin-sections in step 2 comprises:
   performing vacuum perfusion and pressure perfusion for the rock samples using a casting instrument;
   performing rough, medium, fine, and accurate grinding for surfaces of the rock samples using a lapping machine;
   gluing the fine-ground rock samples to micro slides with one side thereof ground to hairy surfaces by applying solid *abies* balsam to central parts of the micro slides, and squeezing the micro slides firmly using a tweezer such that the colloidal layer is thin, uniform, and free of bubbles;
   roughly grinding the glued rock samples using the lapping machine to a thickness of 0.28-0.40 mm, fine grinding the glued rock samples to a thickness of 0.12-0.18 mm, and then the accurately grinding the glued rock samples to a thickness of 0.04-0.05 mm; and
   dropping an appropriate amount of the *abies* balsam onto the casting thin-sections, lightly heating, carefully placing a cover-slip, and removing bubbles by gently squeezing the cover-slip using the tweezer.

5. The method according to claim 4, wherein determining the laumontite contents and the development degrees of the pseudo fractures in step 3 comprises:
   selecting the casting thin-sections from the different rock samples, and capturing a total of 9 pictures under a microscope using an equal probability of 3×3 for a statistical analysis of the laumontite contents; and
   determining the laumontite content and assessing the development degrees of the pseudo fractures by performing an image analysis on the pictures using the Image-Pro-Plus 6.0 software.

6. The method according to claim 5, wherein measuring the porosity and permeability of the selected representative rock samples in step 4 comprises:
   obtaining the overburden pressure porosity, permeability, and the overburden pressure, of the selected representative rock samples using a fully automatic overburden pressure permeability measurement system.

7. The method according to claim 6, wherein comparing the variations in the porosity and permeability in step 5 comprises:
   according to the overburden pressure porosity and permeability and overburden pressure obtained in step 4, plotting a comparison diagram of the overburden pressure porosity and permeability between the laumontite-containing reservoir and the laumontite-free reservoir in an area using the Grapher plotting software, with the overburden pressure as a horizontal coordinate and the porosity and permeability as vertical coordinates.

8. The method according to claim 7, wherein the property correction in step 6 comprises:
   (1) correcting an influence of pseudo fracture development on the porosity and permeability, $$\Phi_{r1} = \frac{\Phi_p}{0.87} \quad \text{Formula (3)}$$

$$K_{r1} = \frac{K_p}{0.53} \quad \text{Formula (4)}$$

wherein, $\Phi_{r1}$ represents a porosity of the laumontite-rich under a normal temperature and pressure after the correction; $\Phi_p$ represents a porosity of the laumontite-rich under the overburden pressure of 20 MPa; $K_{r1}$ represents a permeability of the laumontite-rich under the normal temperature and pressure after correction; and $K_p$ represents a permeability of the laumontite-rich under an overburden pressure of 20 MPa; and (2) under a condition that only reservoir laumontite development and porosity and permeability values under a ground surface normal temperature and pressure are known, obtaining correction of the porosity and permeability of the laumontite-rich reservoir according to a ratio of physical properties before and after the correction, $$\Phi_{r2} = \frac{\Phi_c}{1.35} \quad \text{Formula (5)}$$

$$K_{r2} = \frac{K_c}{2.07} \quad \text{Formula (6)}$$

wherein $\Phi_{r2}$ represents a porosity of the laumontite-rich reservoir under the normal temperature and pressure after correction of a porosity with an unknown overburden pressure; $\Phi_c$ represents a porosity of the laumontite-rich reservoir under the normal temperature and pressure before the correction; $K_{r2}$ represents a permeability of the laumontite-rich reservoir under the normal temperature and pressure after correction of a permeability with an unknown overburden pressure; and $K_c$ represents a permeability of the laumontite-rich reservoir under the normal temperature and pressure before the correction.

\* \* \* \* \*